(12) United States Patent
Kitagawa et al.

(10) Patent No.: US 11,418,092 B2
(45) Date of Patent: Aug. 16, 2022

(54) LUBRICATION MECHANISM FOR BEARING OF VEHICLE ELECTRIC MOTOR

(71) Applicant: TOYOTA JIDOSHA KABUSHIKI KAISHA, Toyota (JP)

(72) Inventors: Katsuhide Kitagawa, Seto (JP); Masaki Mori, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/820,766

(22) Filed: Mar. 17, 2020

(65) Prior Publication Data

US 2020/0343791 A1   Oct. 29, 2020

(30) Foreign Application Priority Data

Apr. 23, 2019   (JP) .............................. JP2019-082350

(51) Int. Cl.
| | |
|---|---|
| *H02K 9/19* | (2006.01) |
| *H02K 7/08* | (2006.01) |
| *H02K 5/22* | (2006.01) |
| *H02K 7/00* | (2006.01) |

(52) U.S. Cl.
CPC ............... *H02K 9/19* (2013.01); *H02K 5/225* (2013.01); *H02K 7/083* (2013.01); *H02K 7/006* (2013.01)

(58) Field of Classification Search
CPC ...... F16C 3/14; F16C 41/005; F16C 33/6637; H02K 7/08; H02K 7/006; H02K 7/083; H02K 5/225; H02K 9/19

USPC .................................................. 310/90, 54
See application file for complete search history.

(56) References Cited

U.S. PATENT DOCUMENTS

| | | | |
|---|---|---|---|
| 7,980,343 B2 * | 7/2011 | Mogi ................. | F16H 57/0476 180/65.6 |
| 2011/0298314 A1 | 12/2011 | Atarashi et al. | |
| 2014/0342872 A1 | 11/2014 | Imai et al. | |
| 2018/0091086 A1 | 3/2018 | Matsubara | |

FOREIGN PATENT DOCUMENTS

| | | |
|---|---|---|
| CN | 103958244 A | 7/2014 |
| CN | 104455353 A | 3/2015 |
| CN | 106089345 A | 11/2016 |
| CN | 108138781 A | 6/2018 |
| EP | 2 799 672 A1 | 11/2014 |
| JP | 8-214491 A | 8/1996 |
| JP | 2006-138399 A | 6/2006 |
| JP | 2011-259590 A | 12/2011 |
| JP | 2013-193515 A | 9/2013 |
| JP | 2018-57183 A | 4/2018 |
| JP | 2019-62584 A | 4/2019 |

* cited by examiner

*Primary Examiner* — Terrance L Kenerly
(74) *Attorney, Agent, or Firm* — Oblon, McClelland, Maier & Neustadt, L.L.P.

(57) ABSTRACT

A lubrication mechanism for supplying oil to a bearing of a vehicle electric motor that includes the bearing, a housing, a stator and a rotor having a rotor shaft rotatably held by the housing through the bearing. The housing defines an oil passage to which oil discharged from an oil pump is to be supplied. The oil passage and the bearing are located on respective opposite sides of a wall of the housing. The lubrication mechanism includes: a bolt hole passing through the wall; and a bolt engaged in the bolt hole.

9 Claims, 3 Drawing Sheets

LUBRICATION MECHANISM FOR BEARING OF VEHICLE ELECTRIC MOTOR

This application claims priority from Japanese Patent Application No. 2019-082350 filed on Apr. 23, 2019, the disclosure of which is herein incorporated by reference in its entirety.

FIELD OF THE INVENTION

The present invention relates to a lubrication mechanism for supplying oil to a bearing rotatably supporting a rotor shaft of a vehicle electric motor.

BACKGROUND OF THE INVENTION

There is known a lubrication mechanism for supplying oil to a bearing of a vehicle electric motor that includes the bearing, a stator and a rotor having a rotor shaft rotatably supported by the bearing. Patent Document 1 discloses a construction of such a lubrication mechanism in which the rotor shaft is a duplex shaft constituted by a first shaft and a second shaft, and oil is caused to flow through a clearance defined between the first and second shafts whereby the oil is supplied to the bearing supporting the rotor shaft.

PRIOR ART LITERATURES

Patent Documents

Patent Document 1: JP-H08-214491A
Patent Document 2: JP-2018-57183A

SUMMARY OF THE INVENTION

By the way, in the lubrication mechanism for lubrication of the bearing, which is disclosed in the Patent Document 1, there is a problem that the construction is complicated, for example, due to the duplex structure of the rotor shaft.

The present invention was made in view of the background art described above. It is therefore an object of the present invention to provide a lubrication mechanism for supplying oil to a bearing of a vehicle electric motor that includes the bearing, a housing, a stator and a rotor having a rotor shaft rotatably held by the housing through the bearing, wherein the lubrication mechanism is capable of supplying the oil to the bearing at an appropriately adjusted rate without having a complicated construction. This object is achieved according to the following aspects of the present invention.

According to a first aspect of the invention, there is provided a lubrication mechanism for supplying oil to a bearing of a vehicle electric motor that includes the bearing, a housing, a stator and a rotor having a rotor shaft rotatably held by the housing through the bearing, wherein the housing defines an oil passage to which oil discharged from an oil pump is to be supplied, and wherein the oil passage and the bearing are located on respective opposite sides of a wall of the housing, The lubrication mechanism comprises: a bolt hole passing though the wall; and a bolt engaged in the bolt hole. For example, the bolt is engaged in the bolt hole, with an external thread of the bolt being in thread engagement with an internal thread of the bolt hole, wherein the external thread and the internal thread cooperate with each other to define therebetween a helically extending clearance that is held in communication with the oil passage that is located on one of the opposite sides of the wall and with a bearing-side space that is located on the other of the opposite sides of the wall, such that the oil is to pass through the helically extending clearance so as to flow from the oil passage located on the one of the opposite sides of the wall, toward the bearing that is provided in the bearing-side space located on the other of the opposite sides of the wall. Still further, for example, the bolt includes (i) an externally threaded portion in which the external thread is provided and (ii) a head portion which is adjacent to the externally threaded portion in an axial direction of the bolt and which faces the oil passage, wherein the head portion of the bolt defines at least one communication passage that communicates between the oil passage and the helically extending clearance, such that the oil is to pass through the at least one communication passage so as to flow from the oil passage toward the helically extending clearance. Moreover, the at least one communication passage may be at least one communication groove provided in one of axially opposite end faces of the head portion, the one of the axially opposite end faces being closer to the externally threaded portion than the other of the axially opposite end faces, the at least one communication groove extending radially inwardly away from an outer circumferential surface of the head portion toward an axis of the bolt.

According to a second aspect of the invention, in the lubrication mechanism according to the first aspect of the invention, the bolt hole and the bolt engaged in the bolt hole cooperate with each other to define therebetween a clearance through which the oil is to flow, wherein the bolt includes an externally threaded portion having an axial length that causes the oil to flow through the clearance at a rate suitable for lubrication of the bearing. It is noted that the above features of the second aspect of the invention may be expressed in a process of manufacturing the lubrication mechanism of the first aspect of the invention, wherein the bolt is engaged in the bolt hole, with an external thread of the bolt and an internal thread of the bolt hole being in thread engagement with each other, wherein the external thread and the internal thread cooperate with each other to define therebetween a helically extending clearance through which the oil is to pass so as to flow from the oil passage that is located on one of the opposite sides of the wall, toward the bearing that is located on the other of the opposite sides of the wall, and wherein the manufacturing process comprises: determining an axial length of the thread engagement of the external thread and the internal thread, depending on a desired rate of flow of the oil through the helically extending clearance; and providing the external thread in the bolt, providing the internal thread in the bolt hole, and engaging the bolt into the bolt hole, such that the thread engagement of the external thread and the internal thread has the determined axial length.

According to a third aspect of the invention, in the lubrication mechanism according to the first or second aspect of the invention, the rotor shaft has a tubular shape, and is provided with a cooling pipe which is disposed inside the rotor shaft, wherein said cooling pipe extends in an axial direction of the rotor shaft, and is connected to the oil passage, and wherein said cooling pipe is fixed to the wall by the bolt through a positioning plate which is attached to the cooling pipe and which is fastened to the wall by the bolt.

According to a fourth aspect of the invention, in the lubrication mechanism according to any one of the first through third aspects of the invention, the oil pump is an electric oil pump.

According to a fifth aspect of the invention, in the lubrication mechanism according to the fourth aspect of the invention, the electric oil pump is controlled such that a duty ratio of the electric oil pump is increased with increase of a temperature of the vehicle electric motor.

In the lubrication mechanism according to the first aspect of the invention, the wall is provided with the bolt hole passing through the wall, and the bolt is engaged in the bolt hole, so that the oil can be supplied to the bearing, by passing through the wall through a clearance between the bolt and the bolt hole. Thus, the oil can be supplied by only providing the bolt hole in the wall and engaging the bolt in the bolt hole, without complicating the construction of the lubrication mechanism. Further, an amount or flow rate of the oil supplied to the bearing can be adjusted, for example, by adjusting an axial length of an externally threaded portion of the bolt that is engaged in the bolt hole.

In the lubrication mechanism according to the second aspect of the invention, the axial length of the externally threaded portion of the bolt engaged in the bolt hole is set to a length value that causes the oil to flow through the clearance at a rate suitable for lubrication of the bearing. Thus, the oil is supplied to the bearing at a suitable rate whereby the bearing is restrained from being worn and galled while the bearing is restrained from being dragged due to excessive amount of supply of the oil to the bearing.

In the lubrication mechanism according to the third aspect of the invention, the bolt is used also as a fastener to fix the cooling pipe provided inside the rotor shaft, so that there is no need to provide a bolt exclusively used to supply the oil to the bearing. Therefore, increase of the number of required elements is restrained.

In the lubrication mechanism according to the fourth aspect of the invention, the oil pump is electric oil pump, so that a flow rate of the oil discharged from the oil pump can be adjusted, for example, depending on an operation state of the electric motor, whereby the oil can be supplied to the bearing at a more suitable rate.

When the temperature of the vehicle electric motor becomes high, in general, a load applied to the bearing and/or a rotational speed of the bearing becomes high. In the lubrication mechanism according to the fifth aspect of the invention, the electric oil pump is controlled such that the duty ratio of the electric oil pump is increased with increase of the temperature of the vehicle electric motor, whereby the flow rate of the oil discharged from the electric oil pump is increased and the flow rate of the oil supplied to the bearing is increased when the temperature of the vehicle electric motor is increased. Therefore, it is possible to restrain wear and galling of the bearing.

DETAILED DESCRIPTION OF PREFERRED EMBODIMENT

The vehicle electric motor is to be provided, for example, in a hybrid-vehicle driving apparatus in which an engine as well as the electric motor is provided to serve as a drive force source for driving a hybrid vehicle and also in an electric-vehicle driving apparatus in which only the electric motor is provided to serve as a drive force source for driving an electric vehicle. That is, the vehicle electric motor is to be provided in a vehicle driving apparatus in which at least the electric motor is provided to serve as a drive force source for driving a vehicle.

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
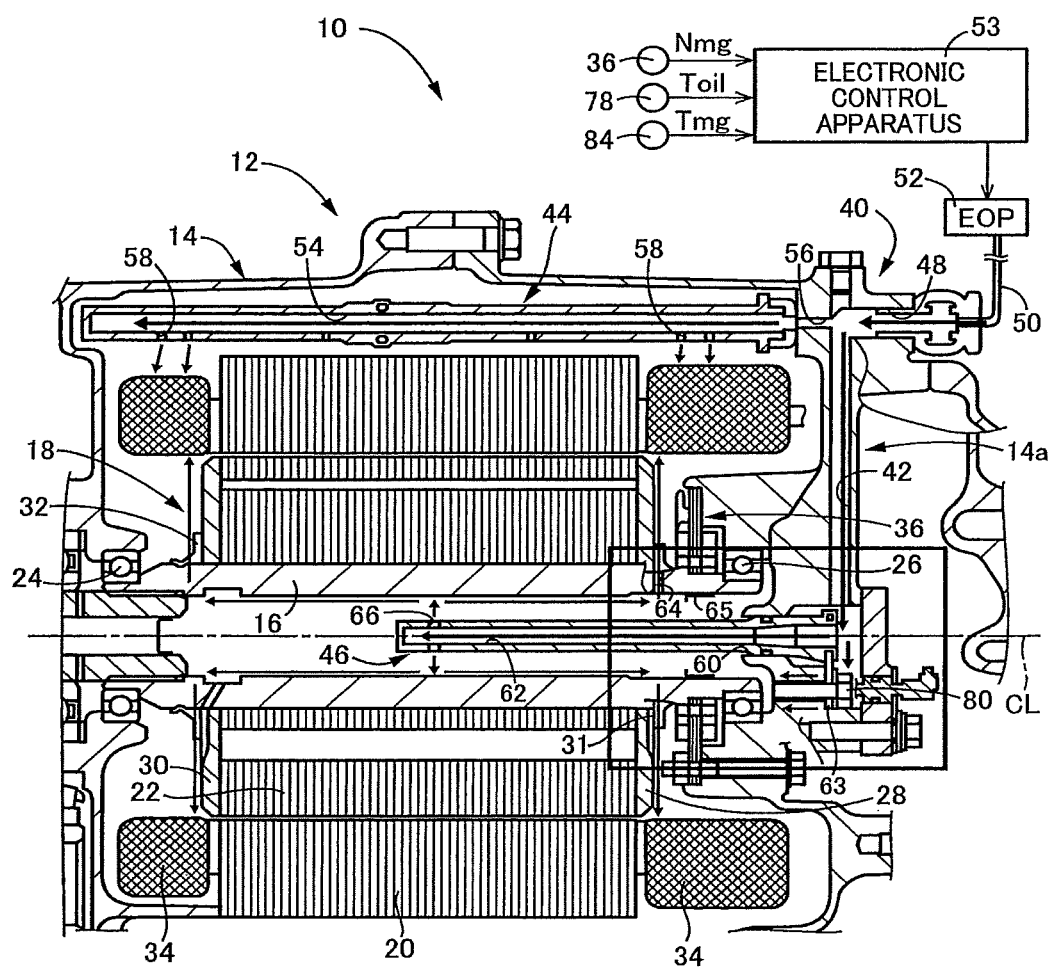
FIG. 1 is a cross sectional view showing a construction of a vehicle electric motor according to an embodiment of the invention, which is to be provided in a vehicle driving apparatus.

FIG. 1 is a cross sectional view of a vehicle electric motor 12 according to the embodiment of the invention, which is to be provided in a vehicle driving apparatus 10. The electric motor 12 is disposed inside a housing 14 as a non-rotary member. The electric motor 12 includes a rotor 18 and a stator 20 that is disposed radially outside the rotor 18.

The rotor 18 includes a rotor shaft 16 and a rotor core 22 fixed onto an outer circumferential surface of the rotor shaft 16.

The rotor shaft 16 has a tubular shape, and is rotatably held at its axially opposite end portions by the housing 14 through a pair of bearings 24, 26 that are provided on the axially opposite end portions of the rotor shaft 16. Thus, the rotor shaft 16 is rotatable about an axis CL.

The rotor core 22 is fixed onto the outer circumferential surface of the rotor shaft 16 so as to be unrotatable relative to the rotor shaft 16. The rotor core 22 has a tubular shape, and is constituted by a plurality of annular-shaped steel plates that are laminated on each other. For example, each of the annular-shaped steel plates constituting the rotor core 22 has a protrusion or protrusions radially inwardly protruding from an inner periphery of the annular-shaped steel plate, and the protrusion or protrusions are engaged in an axial groove or grooves provided in the outer circumferential surface of the rotor shaft 16, so that the rotor core 22 and the rotor shaft 16 are inhibited from being rotated relative to each other.

A pair of end plates 28, 30 are provided on respective opposite sides, which are opposite to each other in an axial direction (i.e., direction of the axis CL), of the rotor core 22, such that each of the end plates 28, 30 is adjacent to a corresponding one of respective opposite ends, which are opposite to each other in the axial direction, of the rotor core 22. Each of the end plates 28, 30 has an annular shape. The end plate 28 is in contact with a protrusion 31 that protrudes radially outwardly from the outer circumferential surface of the rotor shaft 16, so that the end plate 28 is inhibited from being displaced toward the bearing 26 in the axial direction. Further, the end plate 30 is clamped by a nut 32 that is in contact with an axial end face of the end plate 30, which is located on the side of the bearing 24. Thus, the rotor core 22 is clamped at its axially opposite ends by the pair of end plates 28, 30 whereby the rotor core 22 is inhibited from being displaced in the axial direction.

The stator 20 is disposed radially outside the rotor 18. The stator 20 has a tubular shape, and is constituted by a plurality of annular-shaped steel plates that are laminated on each other. The stator 20 is fixed, through bolts (not shown), to the housing 14, so as to be unrotatable relative to the housing 14. The stator 20 is provided with coil wound on the stator 20, and coil ends 34 are located on respective opposite side, in the axial direction, of the stator 20.

A resolver 36 is provide in a position which is adjacent to the bearing 26 in the axial direction and which is located radially inside one of the coil ends 34, and is configured to detect a rotational speed Nmg of the electric motor 12.

The vehicle driving apparatus 10 has an oil supplying mechanism 40 which is provided inside the apparatus 10 and is configured to supply the oil for cooling the electric motor 12. FIG. 1 shows arrows indicating directions of flows of the oil, which are caused by the oil supplying mechanism 40. The oil supplying mechanism 40 includes: an oil passage 42 which is provided in the housing 14; a fist pipe 44 which is located on an upper side of the electric motor 12 in an apparatus installed state in which the drive-force transmitting apparatus 10 is installed in a vehicle and which is connected at its end to the oil passage 42; and a second pipe 46 which is located inside the tubular-shaped rotor shaft 16 and which is connected at its end to the oil passage 42. It is noted that the second pipe 46 corresponds to "cooling pipe" recited in the appended claims.

The oil passage 42 is formed in a wall 14a that is a part of the housing 14. The wall 14a is perpendicular to the axial direction, i.e., the direction of the axis CL, and the oil passage 42 extends perpendicularly to the axial direction. An oil inlet port 48 is provided in a portion of the housing 14, which is an upper portion of the housing 14 in the above-described apparatus installed state, such that the oil passage 42 of the housing 14 is in communication with an exterior of the housing 14 through the oil inlet port 48. The oil inlet port 48 is connected to an electric oil pump 52 through an external pipe 50, so that the oil discharged from the electric oil pump 52 is to be supplied to the oil passage 42 through the external pipe 50. It is noted that the electric oil pump 52 corresponds to "oil pump" recited in the appended claims.

The electric oil pump 52 is to be driven by an electric motor (not shown), and a duty ratio of the electric motor is controlled such that an amount or flow rate of the oil discharged from the electric oil pump 52 is adjusted. For example, with the duty ratio of the electric motor being increased, the rotational speed of the electric motor is increased whereby the rate of the oil discharged from the electric oil pump 52 is increased. The duty ratio of the electric motor is controlled by an electronic control apparatus 53. The electronic control apparatus 53 receives various output signals such as an output signal of the resolver 36 indicative of the rotational speed Nmg of the electric motor 12 detected by the resolver 36, an output signal of an oil temperature sensor 78 indicative of a temperature Toil of the oil detected by the oil temperature sensor 78; and an output signal of a motor temperature sensor 84 indicative of a temperature Tmg of the electric motor 12 detected by the motor temperature sensor 84. The electronic control apparatus 53 is configured to control the duty ratio of the electric motor to a ratio value that is dependent on, for example, the detected temperature Tmg of the electric motor 12.

The housing 14 has a communication hole 56 that is provided to communicate between the oil passage 42 and an end of an oil passage 54 that is provided inside the tubular-shaped first pipe 44, whereby the oil passage 54 of the first pipe 44 and the oil passage 42 are held in communication with each other through the communication hole 56 so that the oil supplied to the oil passage 42 is to be supplied to the oil passage 54 of the first pipe 44.

The first pipe 44 is located on an upper side of the electric motor 12 in a vertical direction in the apparatus installed state, and extends in the axial direction, namely, in parallel with the axis CL. The first pipe 44 extends in the axial direction over a given axial distance such that the first pipe 44 overlaps with the coil ends 34 (that are disposed on axially opposite sides of the stator 20), as seen in a radial direction away from the fist pipe 44 toward the axis CL.

Further, the first pipe 44 has a plurality of oil emitting holes 58 that are provided in each of opposed portions of the first pipe 44 which are opposed to the respective coil ends 34. The oil passage 54 is held in communication with an outside of the first pipe 44 through the oil emitting holes 58. The oil emitted through the oil emitting holes 58 is supplied to the coil ends 34 whereby the coil ends 34 are cooled by the oil.

The second pipe 46 is located radially inside the tubular-shaped rotor shaft 16, and extends in the axial direction (i.e., in an axial direction of the rotor shaft 16), namely, in parallel with the axis CL. The second pipe 46 is inserted at its axial end portion in a fitting hole 60 which is provided in the wall 14a of the housing 14 and which is in communication with the oil passage 42. Further, the second pipe 46 has an axial end opening in its axial end, such that the oil can be supplied through the axial end opening to an oil passage 62 that is defined inside the second pipe 46. Thus, the second pipe 46 is connected to the oil passage 42.

Figure 2:
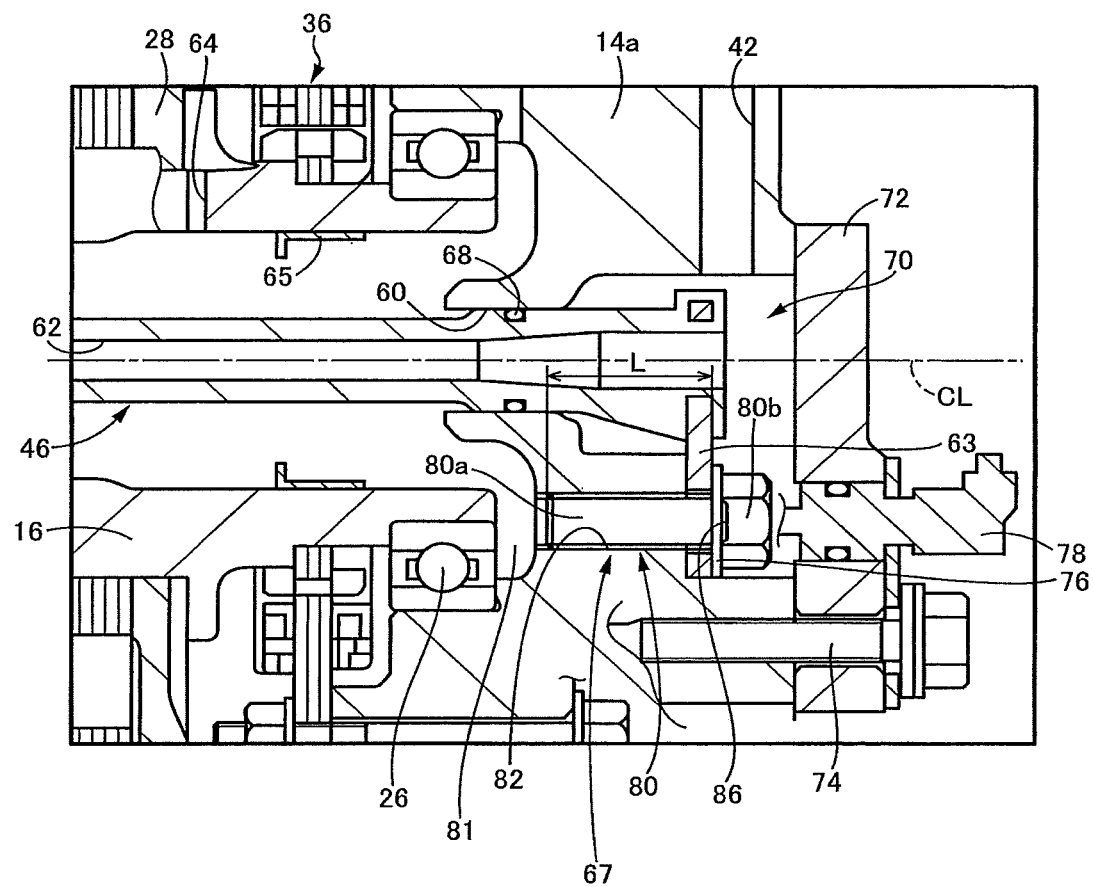
FIG. 2 is a view showing, in enlargement, a part surrounded by square line in in FIG. 1.

The second pipe 46 is made of a resin material, and is formed by an insert forming process such that a positioning plate 63 is attached to the axial end portion of the second pipe 46 concurrently with the formation of the second pipe 46 in the insert forming process. The positioning plate 63 is made of a metallic material, and extends substantially perpendicularly to a longitudinal direction of the second pipe 46. With the positioning plate 63 being fastened to the wall 14a through a bolt 80, the second pipe 46 is fixed relative to the wall 14a through the positioning plate 63, as shown in FIG. 2.

The second pipe 46 extends in the axial direction such that another axial end of the second pipe 46 is located in a central portion of the rotator core 22 in the axial direction. The second pipe 46 has a plurality of oil emitting holes 66 provided in the vicinity of the other axial end of the second pipe 46, such that the oil passage 62 is in communication with an exterior of the oil passage 62 through the oil emitting holes 66. The oil emitted through the oil emitting holes 66 passes through, for example, an interior of the rotor shaft 16 and a radially-extending oil passage 64 communicating between the interior and an exterior of the rotor shaft 16, and is supplied to the coil end 34. In this instance, the oil flowing in the interior of the rotor shaft 16 is guided by an annular-shaped stopper member 65 toward the radially-extending oil passage 64, so as to be efficiently supplied to the coil end 34. The annular-shaped stopper member 65 having an L-shaped cross section is disposed on an inner circumferential surface of the rotor shaft 16, and is located in the vicinity of the bearing 26 in the axial direction.

By the way, since the oil flowing in the interior of the rotor shaft 16 is guided by the stopper member 65 toward the radially-extending oil passage 64, the oil is not substantially supplied to the bearing 26 that rotatably supports the rotor shaft 16. Therefore, an amount or flow rate of supply of the oil to the bearing 26 is made so small that there is a risk that the bearing 26 could suffer from wear and galling due to insufficiency of lubrication of the bearing 26.

For solving the above problem, it might be possible to provide the wall 14a with a communication hole or holes. However, the communication holes have to have a considerably small dimeter of about several tens microns (μm) for establishing an appropriate amount or flow rate of supply of the oil to the bearing 26, so that it would be extremely difficult to machine such communication holes having the considerably small dimeter. Even if such communication holes could be machined by using a drill having a considerably small dimeter, the drill could be easily broken and the communication holes could be easily clogged with cutting chips produced during machining of the holes. Further, since the diameter of the holes is considerably small, a flowing speed of the oil discharged through the holes could be too high to be appropriately supplied to the bearing 26. On the other hand, in the present embodiment, the vehicle electric motor 12 is provided with a lubrication mechanism 67 for supplying the oil to the bearing 26 at an appropriate amount or rate.

FIG. 2 is a view showing, in enlargement, a part surrounded by square line in in FIG. 1. As shown in FIG. 2, the second pipe 46 is inserted at its axial end portion in the fitting hole 60 which is provided in the wall 14a of the housing 14. An oil seal 68 is interposed between an inner circumferential surface of the fitting hole 60 and an outer circumferential surface of the second pipe 46, for avoiding the oil from leaking between the inner circumferential surface of the fitting hole 60 and the outer circumferential surface of the second pipe 46.

The axial end portion of the second pipe 46 is disposed in a space 70 that is a part of the oil passage 42, more specifically, that constitutes a lower end portion of the oil passage 42 in the apparatus installed state. The space 70 is fluid-tightly closed by a plate-shaped cover 72 that is fixed to the wall 14a through at least one bolt 74. The cover 72 is provided with an oil temperature sensor 78 that is configured to detect the temperature Toil of the oil stored in the space 70.

The positioning plate 63 is integrally provided in the axial end portion of the second pipe 46, and includes a perpendicularly-extending portion extending perpendicularly to the longitudinal direction of the second pipe 46. The positioning plate 63 is fastened at the perpendicularly extending portion to the wall 14a by the bolt 80. With the positioning plate 63 being fastened to the wall 14a, the second pipe 46 is fixed relative to the wall 14a by the bolt 80 through the positioning plate 63.

Figure 3:
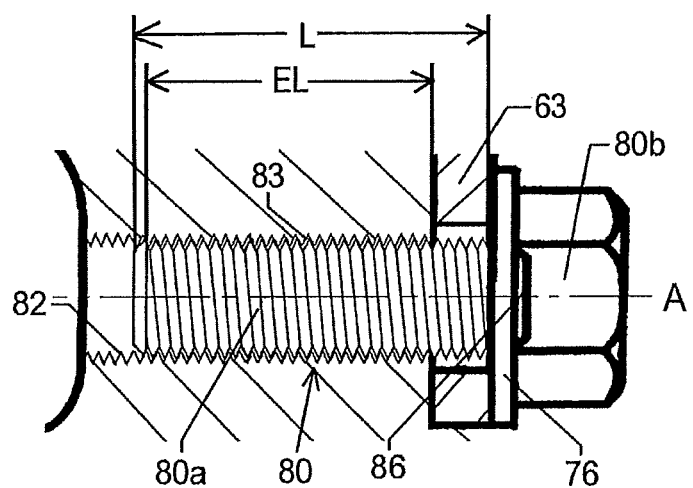
FIG. 3 is a view showing a bolt hole and a bolt that is engaged in the bolt hole in the vehicle electric motor shown in FIG. 1.

The bolt 80 is engaged in a bolt hole 82 provided in the wall 14a, with the blot 80 passing through the positioning plate 63 and a washer 76. The bolt hole 82 is a through-hole formed through the wall 14a to extend in the axial direction, so as to communicate between the space 70 (that is a part of the oil passage 42) and another space 81 in which the bearing 26 and the electric motor 12 are provided. The bolt 80 and the bolt hole 82 cooperate with each other to define therebetween a clearance 83 (see FIG. 3), more precisely, an external thread of the bolt 80 and an internal thread of the bolt hole 82 cooperate with each other to define therebetween the helically-extending clearance 83. The helically-extending clearance 83 having a relatively large length serves a helically-extending oil passage through which the oil is to be supplied to the above-described other space 81 in which the bearing 26 and the electric motor 12 are provided. The helically-extending clearance 83 is in communication with the space 70 (i.e., oil passage 42), through at least one communication passage in the form of at least one communication groove 86 provided in a contact surface of a head portion 80b of the bolt 80 which is in contact with the washer 76, namely, in one of axially opposite end faces of the head portion 80b which is closer to an externally threaded portion 80a of the bolt 80 than the other of the axially opposite end faces of the head portion 80b. The at least one communication groove 86 extends radially inwardly away from an outer circumferential surface of the head portion 80b toward an axis A (see FIG. 3) of the bolt 80 so as to communicate between the space 70 (i.e., oil passage 42) and the helically extending clearance 83. The oil discharged from the electric oil pump 52 is supplied into the space 70, so that the oil stored in the space 70 is pressurized to a certain degree. With the oil being pressurized in the space 70, the oil is caused to flow through the helically-extending clearance 83 defined between the bolt 80 and the bolt hole 82. It is noted that the bolt 80 and the bolt hole 82 that is engaged with the bolt 80 constitute at least a part of the lubrication mechanism 67. It is also noted that the above-described space 81 corresponds to "bearing-side space (that is located on the other of the opposite sides of the wall)" that is defined in the appended claims.

As shown in FIG. 2, the bearing 26 and the space 70 that is a part of the oil passage 42 are disposed on respective opposite sides of the wall 14a. Further, the bearing 26 is located in a position that is adjacent to the bolt hole 82 in the axial direction, so that the oil flowing from the space 70 through the clearance 83 defined between the bolt 80 and the bolt hole 82 is moved along a surface of the wall 14a so as to be supplied to the bearing 26, whereby the bearing 26 is lubricated by the oil having passed through the clearance 83. Further, an amount or flow rate of the oil passing through the clearance 83 can be adjusted by adjusting an axial length L of the externally threaded portion 80a of the bolt 80 or an axial length EL (see FIG. 3) of a thread engagement of the external thread of the bolt 80 and the internal thread of the bolt hole 82, such that the oil can be supplied at an amount or flow rate that is required for lubrication of the bearing 26. For example, the amount or flow rate of the oil passing through the clearance 83 is reduced with increase of the axial length L of the externally threaded portion 80a or the axial length EL of the thread engagement. Therefore, the axial length L or the axial length EL is determined such that the oil is caused to flow through the clearance 83 by an amount or at a rate that is suitable for the lubrication of the bearing 26 under a certain condition of running of the vehicle. The amount or rate of the oil caused to flow through the clearance 83 is determined such that the bearing 26 is restrained from being worn and galled while the bearing 26 is restrained from being dragged due to excessive amount of supply of the oil to the bearing 26. Thus, the oil is supplied to the bearing 26 at a rate or by an amount that is minimally required for lubrication of the bearing 26, so that it is possible to restrain drag of the bearing 26 and also to restrain wear and galling of the bearing 26.

The electronic control apparatus 53 is configured to control a rate of the oil discharged from the electric oil pump 52 such that the rate of discharge of the oil is increased with increase of the temperature Tmg of the electric motor 12, by increasing a rotational speed of the electric oil pump 52 by increasing a duty ratio of an electric motor that is provided to drive the electric oil pump 52. When the temperature Tmg of the electric motor 12 is high, an output of the electric motor 12 or a rotational speed of the rotor shaft 16 of the electric motor 12 could be high so that a load applied to the bearing 26 and a rotational speed of the bearing 26 could be high. In this case in which the required rate of supply of the oil for lubrication of the bearing 26 is increased, the rate of supply of the oil to the bearing 26 is increased in the lubrication mechanism 67 that executes a control in which the duty ratio of the electric motor is increased with increase of the temperature Tmg of the electric motor 12. Therefore, the rate of supply of the oil to the bearing 26 is suitably adjusted whereby the wear and galling of the bearing 26 are restrained. Further, since the rate of discharge of the oil from the electric oil pump 52 is increased, the oil is supplied to a heat generating portion (such as the coil end 34) of the electric motor 12 at an increased rate, thereby providing an advantage also to cooling of the electric motor 12.

Further, the electronic control apparatus 53 may be configured to control the rate of discharge of the oil from the electric oil pump 52 such that the rate of discharge of the oil is increased with increase of the output torque of the electric motor 12, by increasing the rotational speed of the electric oil pump 52 by increasing the duty ratio of the electric motor that is provided to drive the electric oil pump 52. When the output torque of the electric motor 12 is increased, the load applied to the bearing 26 is increased. In this case, the rate of discharge of the oil from the electric oil pump 52 is increased whereby the oil flowing through the clearance 83 between the bolt 80 and the bolt hole 82 at an increased rate so that the rate of supply of the oil to the bearing 26 is increased in the lubrication mechanism 67. Thus, the wear and galling of the bearing 26 due to increase of the load applied to the bearing 26 is restrained. Further, when the output torque of the electric motor 12 is increased, the temperature Tmg of the electric motor 12 could be easily increased. However, the increase of the temperature Tmg of the electric motor 12 is restrained by increase of the rate of discharge of the oil from the electric oil pump 52, which increases also the rate of supply of the oil to the heat generating portion (such as the coil end 34) of the electric motor 12.

Moreover, the electronic control apparatus 53 may be configured to control the rate of discharge of the oil from the electric oil pump 52 such that the rate of discharge of the oil is increased with increase of the rotational speed Nmg of the electric motor 12, by increasing the rotational speed of the electric oil pump 52 by increasing the duty ratio of the electric motor that is provided to drive the electric oil pump 52. When the rotational speed Nmg of the electric motor 12 is increased, the bearing 26 rotatably supporting the rotor shaft 16 is rotated at an increased speed, namely, an inner ring of the bearing 26 is rotated at an increased speed. In this case, the rate of discharge of the oil from the electric oil pump 52 is increased whereby the rate of supply of the oil to the bearing 26 is increased in the lubrication mechanism 67, so that the wear and galling of the bearing 26 due to increase of the rotational speed of the bearing 26 is restrained. Further, when the rotational speed of the rotor shaft 16 is increased, a magnet temperature of the rotor 18 of the electric motor 12 could be easily increased. However, the increase of temperature of the electric motor 12 is restrained by increase of the rate of discharge of the oil from the electric oil pump 52, which increases also the rate of the supply of the oil to the heat generating portion of the electric motor 12.

Thus, the oil is supplied to the bearing 26 at a rate that is appropriately adjusted by changing the duty ratio of the electric oil pump 52 depending on an operation state of the electric motor 12.

As described above, in the present embodiment, the wall 14a as a part of the housing 14 is provided with the bolt hole 82 passing through the wall 14a, and the bolt 80 is engaged in the bolt hole 82, so that the oil can be supplied to the bearing 26, by passing through the wall 14a through the clearance 83 between the bolt 80 and the bolt hole 82. Thus, the oil can be supplied by only providing the bolt hole 82 in the wall 14a and engaging the bolt 80 in the bolt hole 82, without complicating the construction of the lubrication mechanism 67. Further, the amount or the flow rate of the oil supplied to the bearing 26 can be adjusted, for example, by adjusting the axial length L of the externally threaded portion 80a of the bolt 80 that is engaged in the bolt hole 82.

In the present embodiment, the axial length L of the externally threaded portion 80a of the bolt 80 engaged in the bolt hole 82 is set to a length value that causes the oil to flow through the clearance 83 at a rate suitable for lubrication of the bearing 26. Thus, the oil is supplied to the bearing 26 at a suitable rate whereby the bearing 26 is restrained from being worn and galled while the bearing 26 is restrained from being dragged due to excessive amount of supply of the oil to the bearing 26. Further, the bolt 80 is used also as a fastener to fix the second pipe 46 provided inside the rotor shaft 16, so that there is no need to provide a bolt exclusively used to supply the oil to the bearing 26. Therefore, increase of the number of required elements is restrained. Further, the flow rate of the oil discharged from the electric oil pump 52 can be adjusted depending on an operation state of the electric motor 12, whereby the oil can be supplied to the bearing 26 at a more suitable rate.

While the preferred embodiment of this invention has been described in detail by reference to the drawings, it is to be understood that the invention may be otherwise embodied.

For example, in the above-described embodiment, the amount or flow rate of the oil passing through the bolt hole 82 is adjusted by adjusting the axial length L of the externally threaded portion 80a of the bolt 80 or the axial length of EL of the thread engagement of the external thread of the bolt 80 and the internal thread of the bolt hole 82. However, the amount or flow rate of the oil may be adjusted also by changing the grade of the threads provided in the bolt 80 and the bolt hole 82.

In the above-described embodiment, the stator 20 is disposed radially outside the rotor 18 in the electric motor 12. However, the present invention is applicable also to an electric motor in which the stator 20 is disposed radially inside the rotor 18.

In the above-described embodiment, the at least one communication groove 86 as the at least one communication passage is provided in the contact surface of the head portion 80b of the bolt 80 which is in contact with the washer 76, for communicating between the space 70 and the helically-extending clearance 83 defined between the bolt 80 and the bolt hole 82. However, the at least one communication groove 86 may be replaced by at least one communication grove which is provided in the washer 76 and which communicates between the space 70 and the helically-extending clearance 83. Further, the at least one communication passage does not necessarily have to be provided. For example, a surface roughness of the contact surface of the head portion 80b of the bolt 80 that is in contact with the washer 76 and/or a surface roughness of a contact surface of the washer 76 that is in contact with the head portion 80b of the bolt 80 may be increased (roughened) for communicating between the space 70 and the helically-extending clearance 83. Still further, the bolt 80 having the head portion 80b may be replaced by a headless bolt, such that a nut is engaged with an axial end portion of the headless bolt which faces the space 70. In this arrangement, either, the at least one communication passage is not required, as long as a clearance between the headless bolt and the bolt hole 82 is in communication with the space 70 even without provision of the at least one communication passage. Moreover, in the above-described embodiment, the positioning plate 63 is fastened to the wall 14a of the housing 14 by the bolt 80 that is engaged with the bolt hole 82. However, the bolt 80 may be simply engaged with the bolt hole 82 without any member being fastened to the wall 14a by the bolt 80. That is, the bolt 80 does not have to necessarily serve as a fastener as long as the bolt 80 cooperates with the bolt hole 82 to define the clearance 83.

It is to be understood that the embodiment described above is given for illustrative purpose only, and that the present invention may be embodied with various modifications and improvements which may occur to those skilled in the art.

NOMENCLATURE OF ELEMENTS

12: vehicle electric motor
14: housing
14a: wall
16: rotor shaft
18: rotor
20: stator
26: bearing
42: oil passage
46: second pipe (cooling pipe)
52: electric oil pump (oil pump)
63: positioning plate
67: lubrication mechanism
80: bolt
80a: externally threaded portion
82: bolt hole
L: axial length of externally threaded portion

What is claimed is:

1. A lubrication mechanism for supplying oil to a bearing of a vehicle electric motor that includes the bearing, a housing, a stator and a rotor having a rotor shaft rotatably held by the housing through the bearing,
    wherein the housing defines an oil passage to which oil discharged from an oil pump is to be supplied,
    wherein the oil passage and the bearing are located on respective opposite sides of a wall of the housing,
    said lubrication mechanism comprising:
    a bolt hole passing though the wall; and
    a bolt engaged in the bolt hole, and
    wherein the oil is supplied to the bearing from a head portion of the bolt through the wall by being flown through a helically extending clearance between an external thread of the bolt and an internal thread of the bolt hole, when the oil is pressurized by the oil pump.

2. The lubrication mechanism according to claim 1,
    wherein the bolt hole and the bolt engaged in the bolt hole cooperate with each other to define therebetween a clearance through which the oil is to flow, and
    wherein the bolt includes an externally threaded portion having an axial length that causes the oil to flow through the clearance at a rate suitable for lubrication of the bearing.

3. The lubrication mechanism according to claim 1,
    wherein the rotor shaft has a tubular shape, and is provided with a cooling pipe which is disposed inside the rotor shaft,
    wherein said cooling pipe extends in an axial direction of the rotor shaft, and is connected to the oil passage, and
    wherein said cooling pipe is fixed to the wall by the bolt through a positioning plate which is attached to the cooling pipe and which is fastened to the wall by the bolt.

4. The lubrication mechanism according to claim 1, wherein the oil pump is an electric oil pump.

5. The lubrication mechanism according to claim 4, wherein the electric oil pump is controlled such that a duty ratio of the electric oil pump is increased with increase of a temperature of the vehicle electric motor.

6. The lubrication mechanism according to claim 1,
    wherein the bolt is engaged in the bolt hole, with the external thread of the bolt being in thread engagement with the internal thread of the bolt hole, and
    wherein the external thread and the internal thread cooperate with each other to define therebetween the helically extending clearance that is held in communication with the oil passage that is located on one of the opposite sides of the wall and with a bearing-side space that is located on the other of the opposite sides of the wall, such that the oil is to pass through the helically extending clearance so as to flow from the oil passage located on the one of the opposite sides of the wall, toward the bearing that is provided in the bearing-side space located on the other of the opposite sides of the wall.

7. The lubrication mechanism according to claim 6,
    wherein the bolt includes (i) an externally threaded portion in which the external thread is provided and (ii) the head portion which is adjacent to the externally threaded portion in an axial direction of the bolt and which faces the oil passage, and
    wherein the head portion of the bolt defines at least one communication passage that communicates between the oil passage and the helically extending clearance, such that the oil is to pass through the at least one communication passage so as to flow from the oil passage toward the helically extending clearance.

8. The lubrication mechanism according to claim 7,
    wherein the at least one communication passage is at least one communication groove provided in one of axially opposite end faces of the head portion, the one of the axially opposite end faces being closer to the externally threaded portion than the other of the axially opposite end faces, the at least one communication groove extending radially inwardly away from an outer circumferential surface of the head portion toward an axis of the bolt.

9. A process of manufacturing the lubrication mechanism defined in claim I,
    wherein the bolt is engaged in the bolt hole, with an external thread of the bolt and an internal thread of the bolt hole being in thread engagement with each other, and
    wherein the external thread and the internal thread cooperate with each other to define therebetween a helically extending clearance through which the oil is to pass so as to flow from the oil passage that is located on one of the opposite sides of the wall, toward the bearing that is located on the other of the opposite sides of the wall,
    the process comprising:
    determining an axial length of the thread engagement of the external thread and the internal thread, depending on a. desired rate of flow of the oil through the helically extending clearance; and
    providing the external thread in the bolt, providing the internal thread in the bolt hole, and engaging the bolt into the bolt hole, such that the thread engagement of the external thread and the internal thread has the determined axial length.

* * * * *